United States Patent
Tramiel et al.

(10) Patent No.: US 11,936,142 B2
(45) Date of Patent: Mar. 19, 2024

(54) GRAPHICS-CARD POWER CONNECTOR

(71) Applicant: Palo Alto Innovation, LLC, Santa Clara, CA (US)

(72) Inventors: Samuel Alexander Tramiel, Mountain View, CA (US); Dawid Bogdal, Sunnyvale, CA (US); Darius Mostowfi, San Carlos, CA (US)

(73) Assignee: Palo Alto Innovation, LLC, Santa Clara, CA (US)

( * ) Notice: Subject to any disclaimer, the term of this patent is extended or adjusted under 35 U.S.C. 154(b) by 0 days.

(21) Appl. No.: 17/714,751

(22) Filed: Apr. 6, 2022

(65) Prior Publication Data

US 2022/0329016 A1    Oct. 13, 2022

Related U.S. Application Data

(60) Provisional application No. 63/173,359, filed on Apr. 10, 2021.

(51) Int. Cl.
*H01R 12/57* (2011.01)
*G06F 1/18* (2006.01)
*H01R 13/66* (2006.01)
*H01R 13/717* (2006.01)

(52) U.S. Cl.
CPC .......... *H01R 13/665* (2013.01); *G06F 1/185* (2013.01); *H01R 12/57* (2013.01); *H01R 13/7175* (2013.01)

(58) Field of Classification Search
CPC ............. H01R 13/665; H01R 13/6658; H01R 31/065; H01R 31/06; H01R 12/716; H01R 13/7175; H01R 12/79; H01R 12/75; H01R 43/205; H01R 12/52
See application file for complete search history.

(56) References Cited

U.S. PATENT DOCUMENTS

| | | | |
|---|---|---|---|
| 6,111,755 A * | 8/2000 | Park ....................... | H04R 5/00 |
| | | | 361/679.21 |
| 9,600,040 B1 * | 3/2017 | Han ........................ | G06F 1/186 |
| 9,710,421 B2 * | 7/2017 | Tamarkin ............... | H05K 3/308 |
| 10,272,826 B2 * | 4/2019 | Daylong ................. | F21S 45/10 |
| 10,727,660 B1 * | 7/2020 | Chen ...................... | G02B 6/4202 |
| 10,958,005 B1 * | 3/2021 | Dube ..................... | H01R 12/737 |

(Continued)

OTHER PUBLICATIONS

EVGA, "EVGA PowerLink," archived Jan. 15, 2021, https://web.archive.org/web/20210115141859/https://www.evga.com/articles/01051/evga-powerlink/.

(Continued)

*Primary Examiner* — Truc T Nguyen
(74) *Attorney, Agent, or Firm* — Huse IP Law; Charles C. Huse (57) ABSTRACT

A power connector includes a first printed circuit board (PCB) to connect to a plurality of power cables and receive power from the plurality of power cables. The power connector also includes a plug, which is electrically connected to the first PCB, to connect to a graphics card and provide the power to the graphics card. The power connector may further include a second PCB electrically connected between the first PCB and the plug, a casing to house the first PCB and/or the second PCB, and/or light-emitting diodes (LEDs) to be illuminated during operation of the graphics card.

28 Claims, 9 Drawing Sheets

(56) References Cited

U.S. PATENT DOCUMENTS

| | | | | |
|---|---|---|---|---|
| 2013/0078837 | A1* | 3/2013 | He | G06F 1/188 |
| | | | | 439/212 |
| 2013/0178093 | A1* | 7/2013 | Altice | G05B 19/0428 |
| | | | | 439/620.21 |
| 2017/0102749 | A1* | 4/2017 | Han | G06F 1/3296 |
| 2018/0059711 | A1* | 3/2018 | Han | G06F 1/08 |
| 2018/0109021 | A1* | 4/2018 | Han | H01R 12/721 |
| 2019/0073005 | A1* | 3/2019 | Han | G06F 1/20 |
| 2019/0146562 | A1* | 5/2019 | Rösler | G06F 1/183 |
| | | | | 361/679.49 |
| 2019/0311158 | A1* | 10/2019 | Han | G06F 21/86 |
| 2021/0013649 | A1* | 1/2021 | Costello | H01R 12/7088 |
| 2021/0103321 | A1* | 4/2021 | Huang | H02M 7/02 |

OTHER PUBLICATIONS

Vortez Reviews, "Lian Li Strimer Review," Aug. 29, 2018, https://www.vortez.net/articles_pages/lian_li_strimer_review,1.html.

* cited by examiner

GRAPHICS-CARD POWER CONNECTOR

RELATED APPLICATION

This application claims the benefit of U.S. Provisional Patent Application No. 63/173,359, filed on Apr. 10, 2021, which is incorporated by reference in its entirety.

TECHNICAL FIELD

This disclosure relates to power connectors, and more specifically to routing power for graphics cards in computer systems such as personal computers for gaming ("gaming PCs").

BACKGROUND

Gaming PCs are usually built or accessorized to have dramatic appearances. For example, gaming PCs may have bright lighting that illuminates their interiors. Gamers value this dramatic appearance and might even consider the appearance of a gaming PC to be almost as important, or as important, a feature as the performance of the gaming PC.

Gaming PCs include graphics cards, which are the most expensive component in the PCs and the leading determinant of the performance of the PCs. Graphics cards have high power consumption. Power is provided to graphics cards through multiple power cables. These power cables detract from the appearance of gaming PCs; for example, they often have a "rats' nest" appearance. The poor appearance of the power cables is exacerbated by the fact that graphics cards are situated in the middle of the PC chassis due to motherboard standards.

SUMMARY

According, there is a need for more elegant systems and methods for routing power to graphics cards in computer systems such as gaming PCs.

In some embodiments, a power connector includes a first printed circuit board (PCB) to connect to a plurality of power cables and receive power from the plurality of power cables. The power connector also includes a plug, which is electrically connected to the first PCB, to connect to a graphics card and provide the power to the graphics card.

In some embodiments, a computer system includes a chassis, a graphics card disposed within the chassis, a plurality of power cables to provide power for the graphics card, and a power connector disposed within the chassis. The graphics card includes a graphics processing unit. The power connector includes a first PCB that is electrically connected to the plurality of power cables to receive the power from the plurality of power cables. The power connector also includes a plug that is electrically connected to the first PCB and to the graphics card to provide the power to the graphics card.

In some embodiments, a method performed in a computer system includes providing power from a plurality of power cables through a power connector to a graphics card. The power connector includes a first PCB electrically connected to the plurality of power cables and a plug electrically connected to the first PCB and to the graphics card. Providing the power includes receiving the power in the first PCB from the plurality of power cables and providing the power to the graphics card through the plug.

Such devices, systems, and methods route power to graphics cards in an elegant manner with a clean appearance. The appearance may be made dramatic by adding lighting to the power connector and illuminating the lighting while providing power to the graphics card.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, and components have not been described in detail so as not to unnecessarily obscure aspects of the embodiments.

Figure 1A:
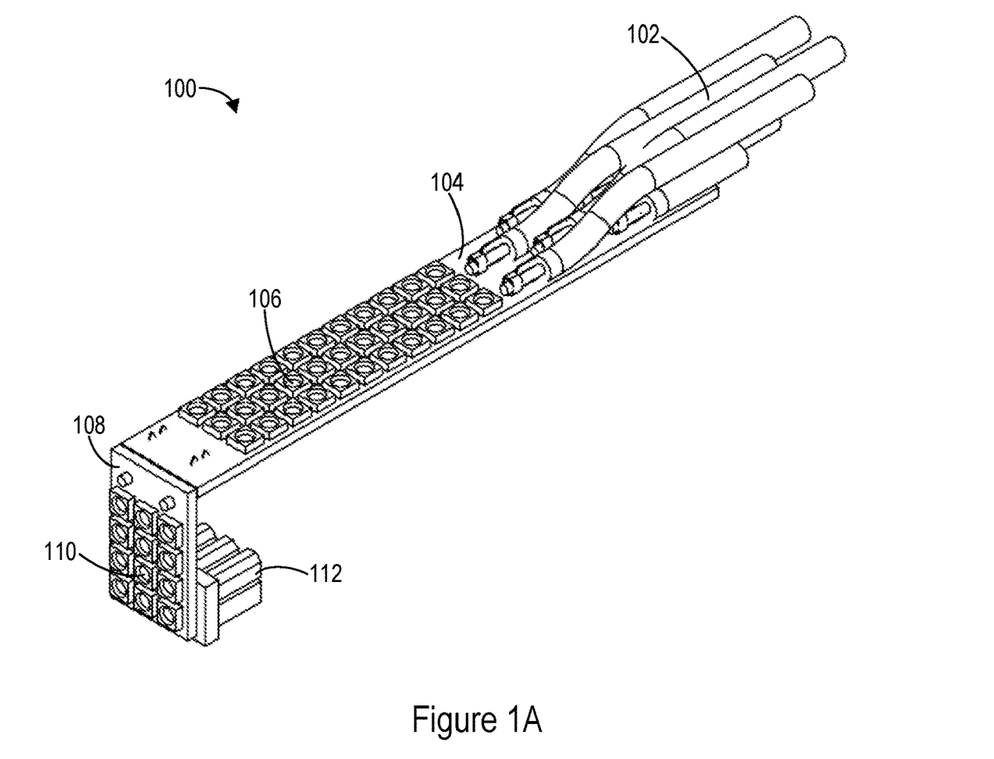
FIGS. 1A-1E are respective views of a graphics-card power connector without a casing, in accordance with some embodiments.
Figure 1B:
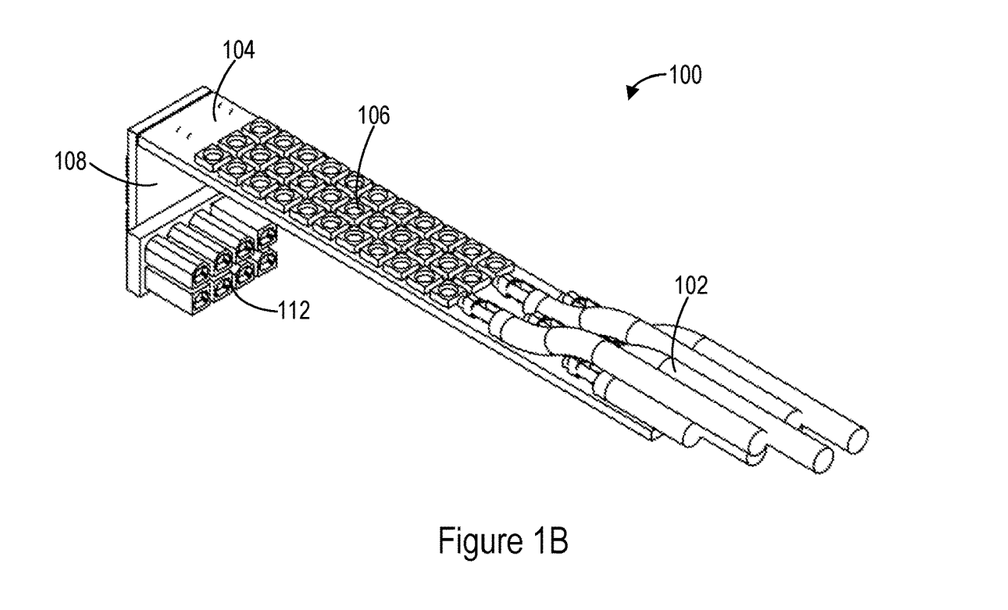
Figure 1C:
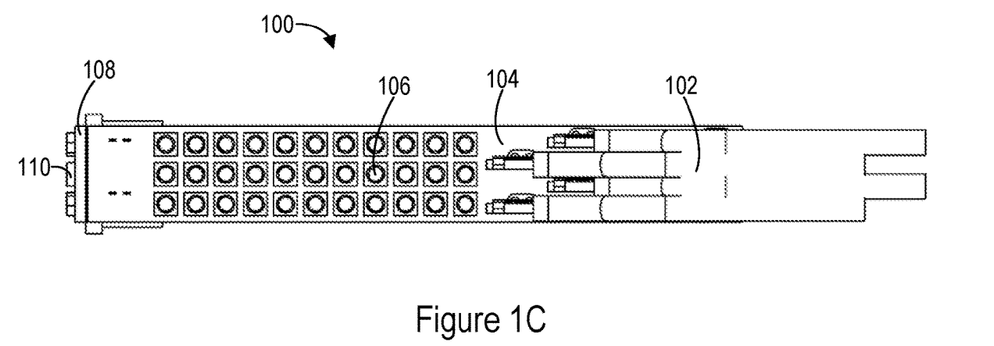
Figure 1D:
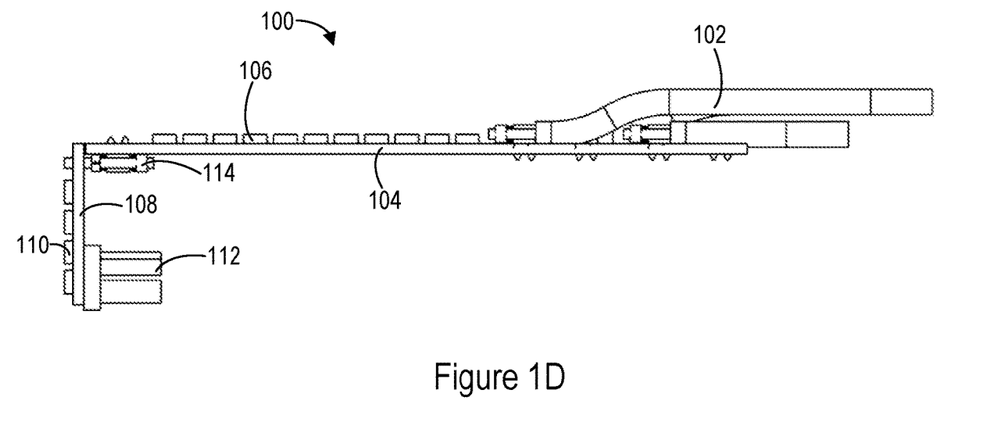
Figure 1E:
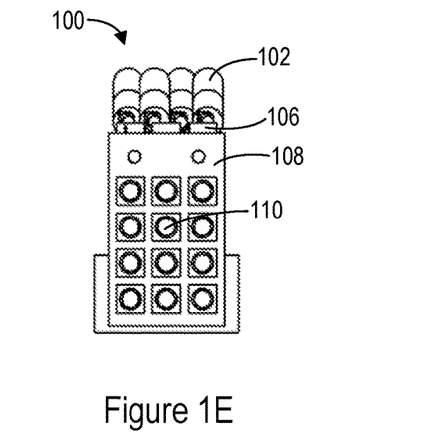

FIGS. 1A-1E are respective views of a power connector 100 for a graphics card in a computer system, in accordance with some embodiments. FIGS. 1A and 1B are perspective views of the power connector 100, FIG. 1C is a plan view of the power connector 100, FIG. 1D is a side view along the length of the power connector 100, and FIG. 1E is a side view of an end of the power connector 100. The power connector 100 is shown without a casing. An example of a casing for the power connector 100 is shown in FIGS. 2A-2E (described below).

The power connector 100 includes a first printed circuit board (PCB) 104 and a second PCB 108. In some embodiments, the first PCB 104 and the second PCB 108 are arranged at a right angle to each other (e.g., substantially at a right angle, to within manufacturing tolerances). For example, a connector 114 (FIG. 1D) mechanically and electrically couples the first PCB 104 with the second PCB 108 at a right angle. The connector 114 may be situated in the inside of a corner at which the first PCB 104 and the second PCB 108 meet. An end of the first PCB 104 may be in contact with or adjacent to an end of the second PCB 108 at this corner. The connector 114 may include a plurality of direct-solder terminals that are respectively soldered to the first PCB 104 and the second PCB 108. The connector 114 is situated on the bottom side of the first PCB 104 and the interior side of the second PCB 108, in accordance with some embodiments.

A plurality of power cables 102 (e.g., 12V power cables) are mechanically and electrically connected to the first PCB 104 (e.g., are soldered to the first PCB 104). In some embodiments, the top side of the first PCB 104 has a plurality of conductive pads to which the ends of respective power cables 102 may be soldered. Alternatively, as shown for example in FIG. 7 for a power connector 700, the plurality of power cables 102 terminates in a receptacle 704 that mates with a plug 702 (distinct from the plug 112) mounted on the first PCB 104, such that the plug 702 and receptacle 704 mechanically and electrically connect the plurality of power cables 102 to the first PCB 104. A plug 112 is coupled (e.g., soldered or otherwise connected) to the second PCB 108 (e.g., to the interior side of the second PCB 108). The plug 112 is compatible with a receptacle on a graphics card, such that the plug 112 may be plugged into the receptacle and thereby connected to the graphics card. The first PCB 104 and the second PCB 108 each have power planes and/or traces to conduct power. Power is provided from the plurality of power cables 102 through the first PCB 104, connector 114, second PCB 108, and plug 112 to the graphics card, and thus to a graphics processing unit (GPU) on the graphics card. The first PCB 104 is electrically connected to the plug 112 through the connector 114 and the second PCB 108. In some embodiments, the first PCB 104, connector 114, second PCB 108, and plug 112 are each configured to provide 150 W of power or 300 W of power.

In some embodiments, the second PCB 108 is omitted, but the first PCB 104 is still electrically connected to the plug 112. Power is provided from the plurality of power cables 102 through the first PCB 104 and the plug 112 to the graphics card. For example, a cable or a plurality of wires electrically connects the first PCB 104 to the plug 112. The power is provided from the first PCB 104 through the cable or plurality of wires to the plug 112.

The upper surface of the first PCB 104 has a first plurality of light-emitting diodes (LEDs) 106 (or other light sources) mounted on it or otherwise coupled to it. In some embodiments, the first LEDs 106 are arranged in an array. FIGS. 1A-1D show a 3×11 array of first LEDs 106, but other arrangements (e.g., arrays with different numbers of rows and/or columns of first LEDs 106) are possible. In some embodiments, the first LEDs 106 include respective LEDs of multiple colors (e.g., red LEDs, green LEDs, and/or blue LEDs). The first LEDs 106 may include multi-colored LED devices (e.g., RGB (red/green/blue) LEDs). The first LEDs 106 may be illuminated while the computer system that includes the graphics card is powered on. In some embodiments, the first LEDs 106 may flash or blink in one or more patterns. In some embodiments, the first LEDs 106 receive power from the motherboard of the computer system.

The exterior (i.e., outer) surface of the second PCB 108 has a second plurality of light-emitting diodes (LEDs) 110 (or other light sources) mounted on it or otherwise coupled to it. In some embodiments, the second LEDs 110 are arranged in an array. FIGS. 1A, 1D, and 1E show a 3×4 array of second LEDs 110, but other arrangements (e.g., arrays with different numbers of rows and/or columns of second LEDs 110) are possible. In some embodiments, the second LEDs 110 include respective LEDs of multiple colors (e.g., red LEDs, green LEDs, and/or blue LEDs). The second LEDs 110 may include multi-colored LED devices (e.g., RGB (red/green/blue) LEDs). The second LEDs 110 may be illuminated while the computer system that includes the graphics card is powered on. In some embodiments, the second LEDs 110 may flash or blink in one or more patterns. In some embodiments, the second LEDs 110 receive power from the motherboard of the computer system.

In some embodiments, the second LEDs 110 are absent from the power connector 100 or 700 but the first LEDs 106 are included in the power connector 100 or 700. In other embodiments, the first LEDs 106 are absent from the power connector 100 or 700 but the second LEDs 110 are included in the power connector 100 or 700.

In some embodiments, the first LEDs 106 and/or the second LEDs 110 may receive power and be controlled through one or more cables (not shown) that are separate from the plurality of power cables 102. The one or more cables may connect to the first PCB 104 and/or the second PCB 108 on one end and to an LED controller on the other end. The LED controller may be implemented on the motherboard of the computer system or may be separate from the motherboard.

Figure 2A:
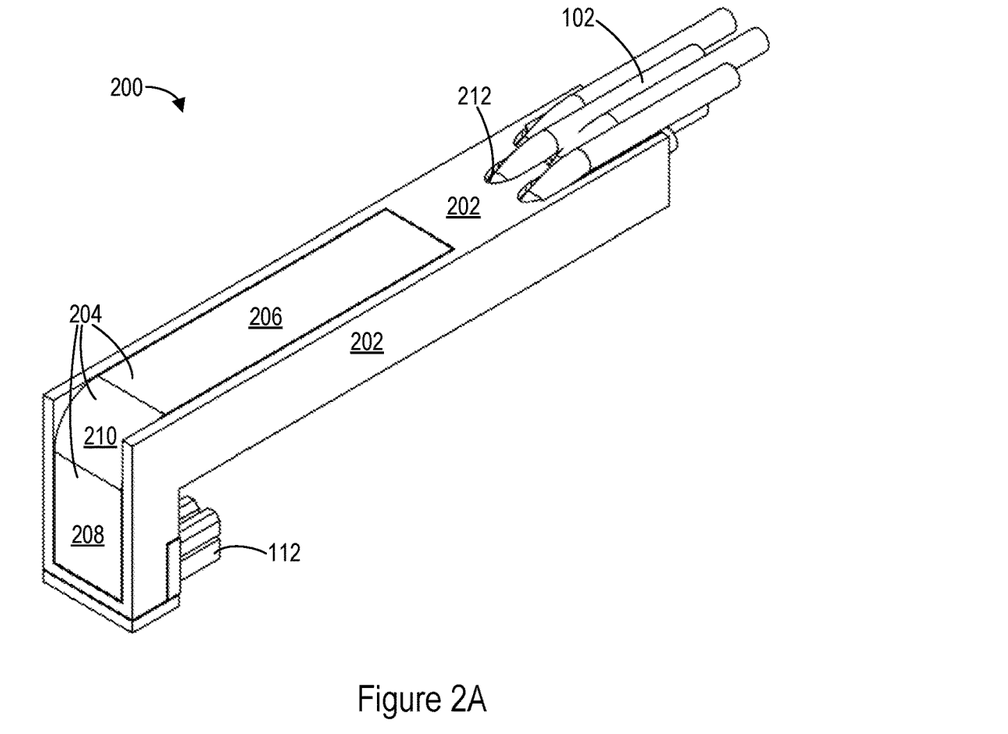
FIGS. 2A-2E are respective views of a graphics-card power connector (e.g., the power connector of FIGS. 1A-1E) with a casing, in accordance with some embodiments.
Figure 2B:
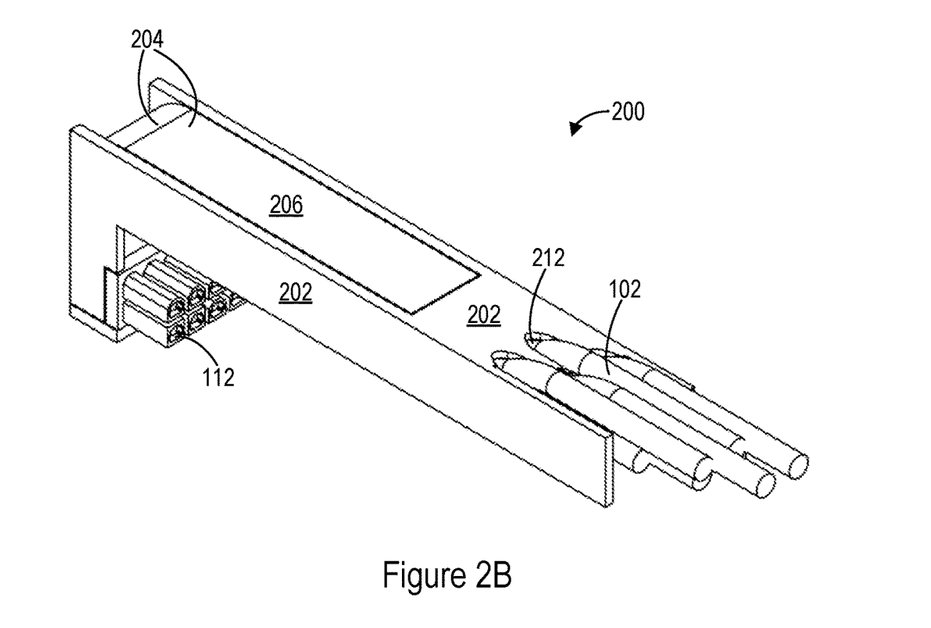
Figure 2C:
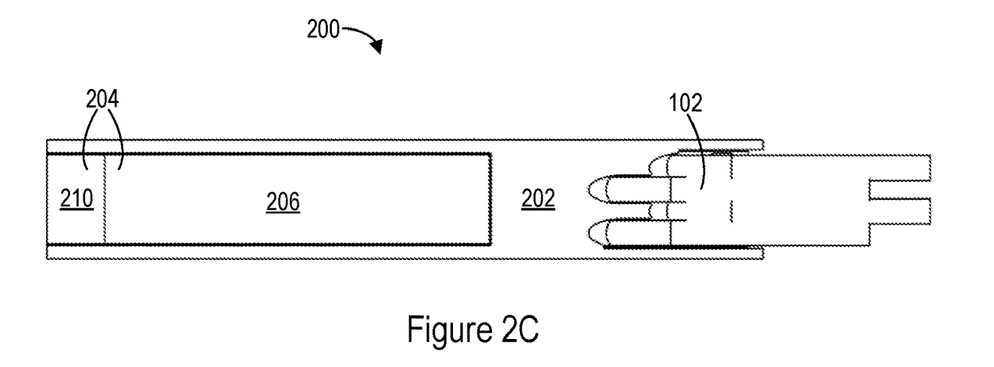
Figure 2D:
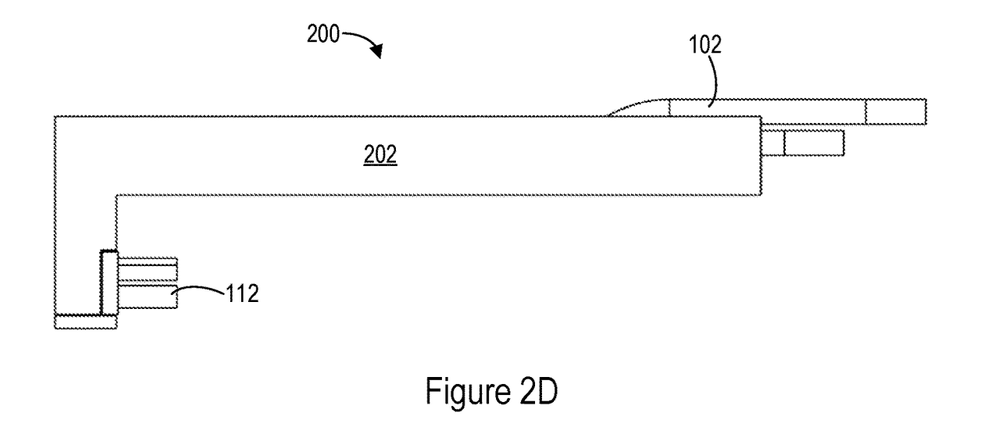
Figure 2E:
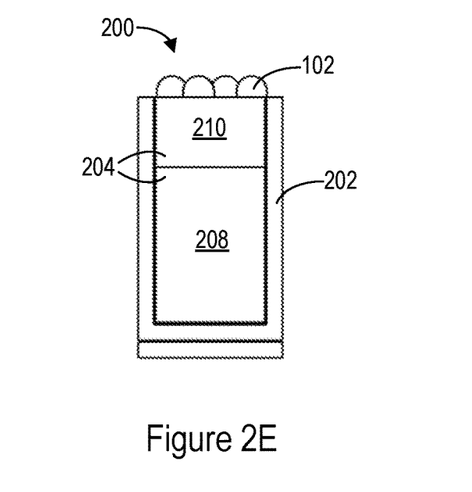
Figure 7:
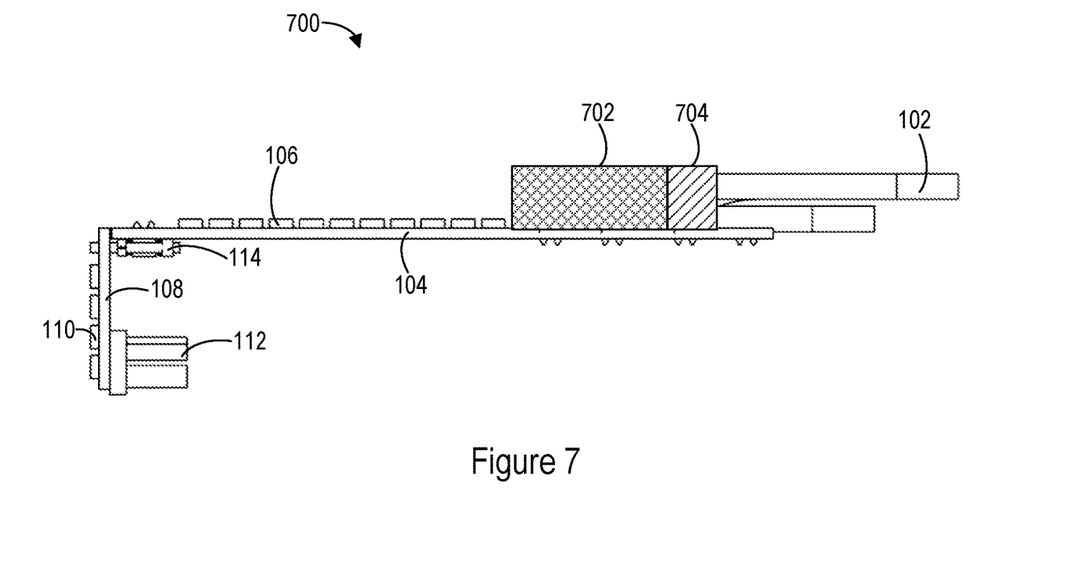
FIG. 7 is a side view of a graphics-card power connector without a casing, along the length of the power connector, in accordance with some embodiments.

FIGS. 2A-2E are respective views of a power connector 200 for a graphics card in a computer system, in accordance with some embodiments. FIGS. 2A and 2B are perspective views of the power connector 200, FIG. 2C is a plan view of the power connector 200, FIG. 2D is a side view along the length of the power connector 200, and FIG. 2E is a side view of an end of the power connector 200. The power connector 200 includes a casing 202 that houses components of the power connector 200. For example, the casing 202 houses (e.g., surrounds) the power connector 100 (FIGS. 1A-1E) or 700 (FIG. 7).

The plurality of power cables 102 pass through the casing 202 (e.g., through the top surface of the casing 102). For example, the casing 202 (e.g., the top surface of the casing 102) has a plurality of holes 212 to receive the respective power cables 102 (i.e., through which respective power cables 102 may pass). The plurality of power cables 102 may connect to the first PCB 104 (FIGS. 1A-1E). For example, the plurality of power cables 102 may be soldered to the first PCB 104 or may be connected to the first PCB 104 by a receptacle 704 (FIG. 7) at the end of the plurality of power cables 102 that is mated to a plug 702 (FIG. 7) mounted in the first PCB 104.

The plug 112 extends from the casing 202 (e.g., from a lower interior surface of the casing 202), such that it may be plugged into the receptacle on the graphics card and thereby connected to the graphics card. The plug 112 may be connected (e.g., soldered) to the second PCB 108 (FIGS. 1A-1E), from which it extends.

The casing 202 includes a diffuser 204 to diffuse light from the first LEDs 106 and/or the second LEDs 110 (FIGS. 1A-1E). The diffuser 204 is sufficiently translucent to transmit diffuse light from the first LEDs 106 and/or the second LEDs 110, while the remainder of the casing 202 may be opaque (e.g., such that the first PCB 104, the second PCB 108, the first LEDs 106, the second LEDs 110, and the ends of the power cables 102 are not visible through the casing 202). In some embodiments, the first PCB 104, the second PCB 108, the first LEDs 106, and/or the second LEDs 110 are not visible through the diffuser 204.

In some embodiments, the diffuser 204 includes a first diffuser surface 206 situated adjacent to (e.g., above) the first LEDs 106 to diffuse light from the first LEDs 106. The diffuser 204 may also include a second diffuser surface 208 situated adjacent to (e.g., alongside) the second LEDs 110 to diffuse light from the second LEDs 110. The diffuser 204 may further include a third diffuser surface 210 that joins the first diffuser surface 206 with the second diffuser surface 208 (e.g., such that the first diffuser surface 206, second diffuser surface 208, and third diffuser surface 210 compose a single integrated component of the casing 202). The third diffuser surface 210 may be curved, as shown in FIGS. 2A-2E, or may connect the first diffuser surface 206 and the second diffuser surface 208 at a slant. Alternatively, the third diffuser surface 210 may be omitted (e.g., such that the first diffuser surface 206 and the second diffuser surface 208 meet at a right angle).

In some embodiments, instead of a single diffuser 204, the casing 202 may have multiple diffusers. For example, the casing 202 may have a first diffuser to diffuse light from the first LEDs 106 and a second diffuser (e.g., unconnected to the first diffuser) to diffuse light from the second LEDs 110. In some embodiments, the first diffuser surface 206 may be replaced with a plurality of first diffuser surfaces (e.g., which are unconnected) situated adjacent to (e.g., above) the first LEDs 106 and/or the second diffuser surface 208 may be replaced with a plurality of second diffuser surfaces (e.g., which are unconnected) situated adjacent to (e.g., alongside) the second LEDs 110. If the first LEDs 106 are omitted from the connector 200, then the first diffuser surface 206 (or first diffuser surfaces) and/or the third diffuser surface 210 may be omitted. If the second LEDs 110 are omitted from the connector 200, then the second diffuser surface 208 (or second diffuser surfaces) and/or the third diffuser surface 210 may be omitted. The second LEDs 110 may be omitted because they are left off of the second PCB 108 or because the second PCB 108 is omitted. In general, the casing 202 may have one or more diffusers to diffuse light from the first LEDs 106 and/or the second LEDs 110.

In some embodiments, the first LEDs 106 and the second LEDs 110 are absent, the diffuser 204 is also absent, and the casing 202 is completely opaque. For example, the first LEDs 106 and the second LEDs 110 are omitted from the power connector 100 or 700, which is housed in the casing 202.

Figure 3:
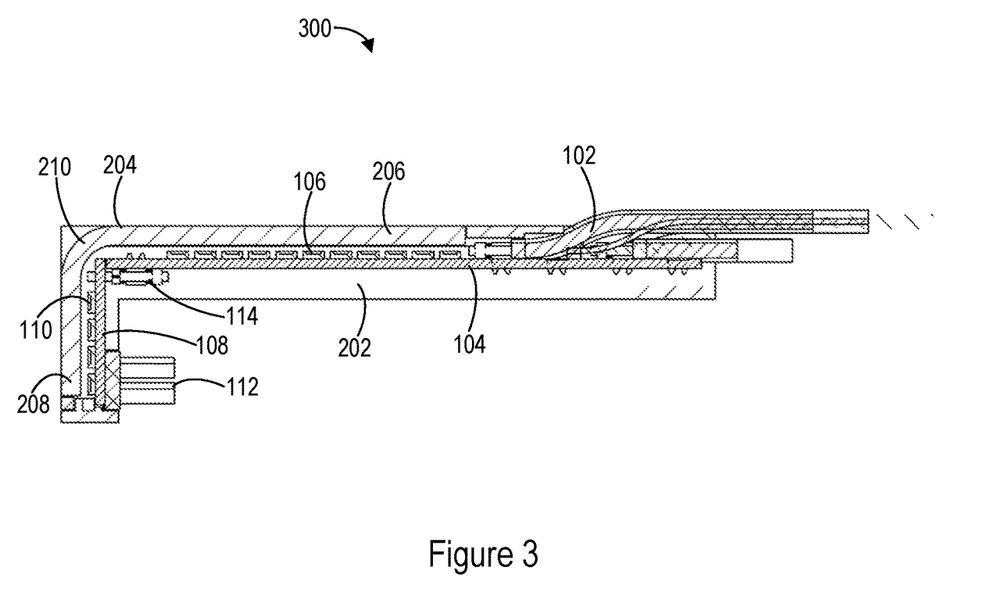
FIG. 3 is a cross-sectional side view of the power connector of FIGS. 2A-2E along the length of the power connector, in accordance with some embodiments.

FIG. 3 is a cross-sectional side view of a power connector 300 along the length of the power connector 300, in accordance with some embodiments. The power connector 300 is an example of the power connector 200, with the casing 202 housing the power connector 100 or 700.

Figure 4:
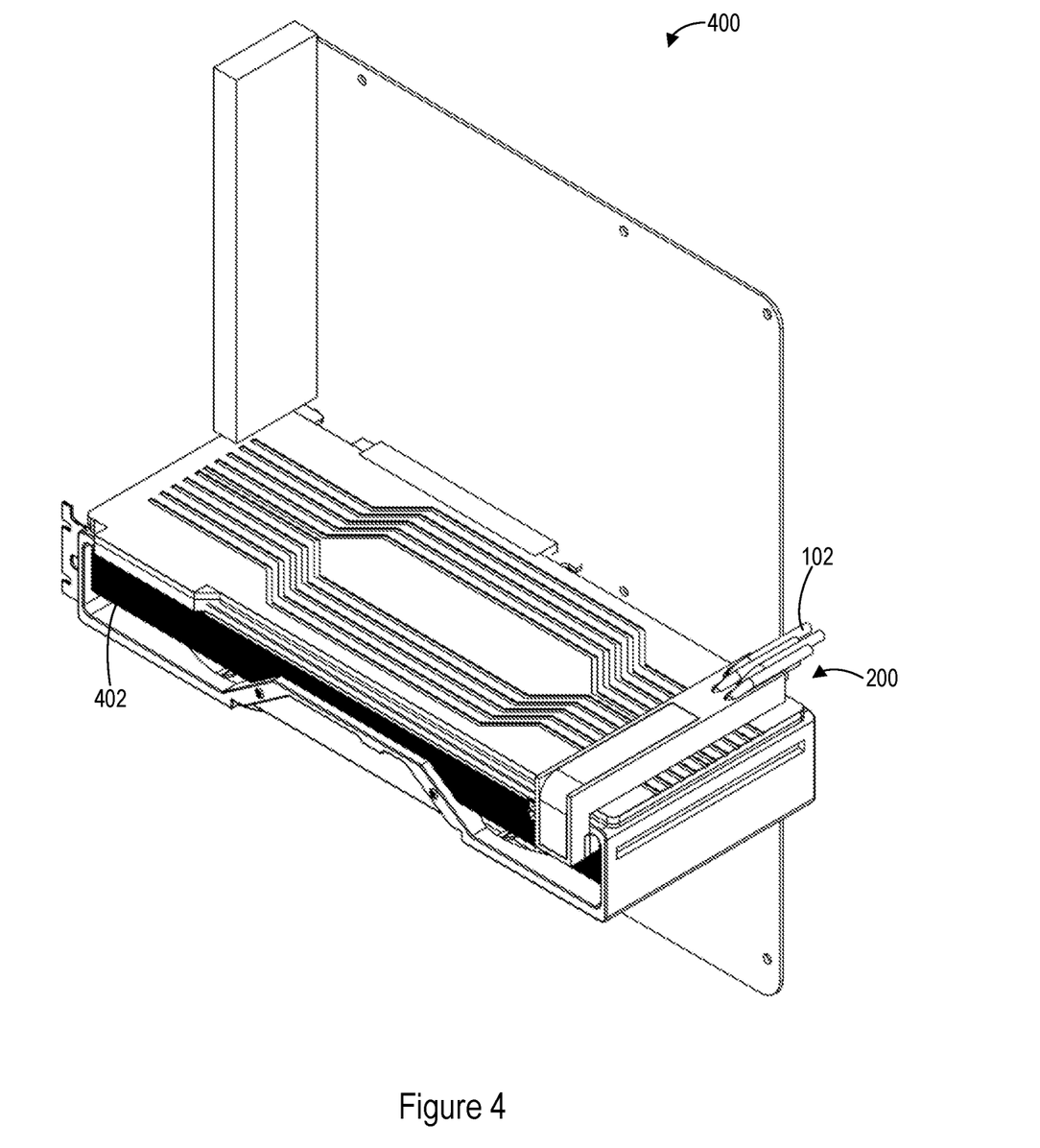
FIG. 4 shows a system in which the power connector of FIGS. 2A-2E connects to a graphics card, in accordance with some embodiments.

FIG. 4 shows a system 400 in which the power connector 200 (FIGS. 2A-2E) connects to a graphics card 402, in accordance with some embodiments. The graphics card 402 includes a GPU. The power connector 200 provides power from the plurality of power cables 102 to the graphics card 402. The portion of the casing 202 that houses (e.g., surrounds) the first PCB 104 is situated above (e.g., is mounted on) the top of the graphics card 402. The plug 112 and the portion of the casing 202 that houses (e.g., surrounds) the second PCB 108 hook around the top of the graphics card 402, with the plug 112 connecting to the graphics card 402 (i.e., being inserted into a receptacle, which is not visible, in the graphics card 402). In some embodiments, the system 400 has multiple (e.g., two) power connectors 200, each of which connects to a respective receptacle in the graphics card 402. The multiple power connectors 200 may be situated next to each other (e.g., such that the portion of each casing 202 that houses a respective first PCB 104 is situated above the top of the graphics card 402).

Figure 5:
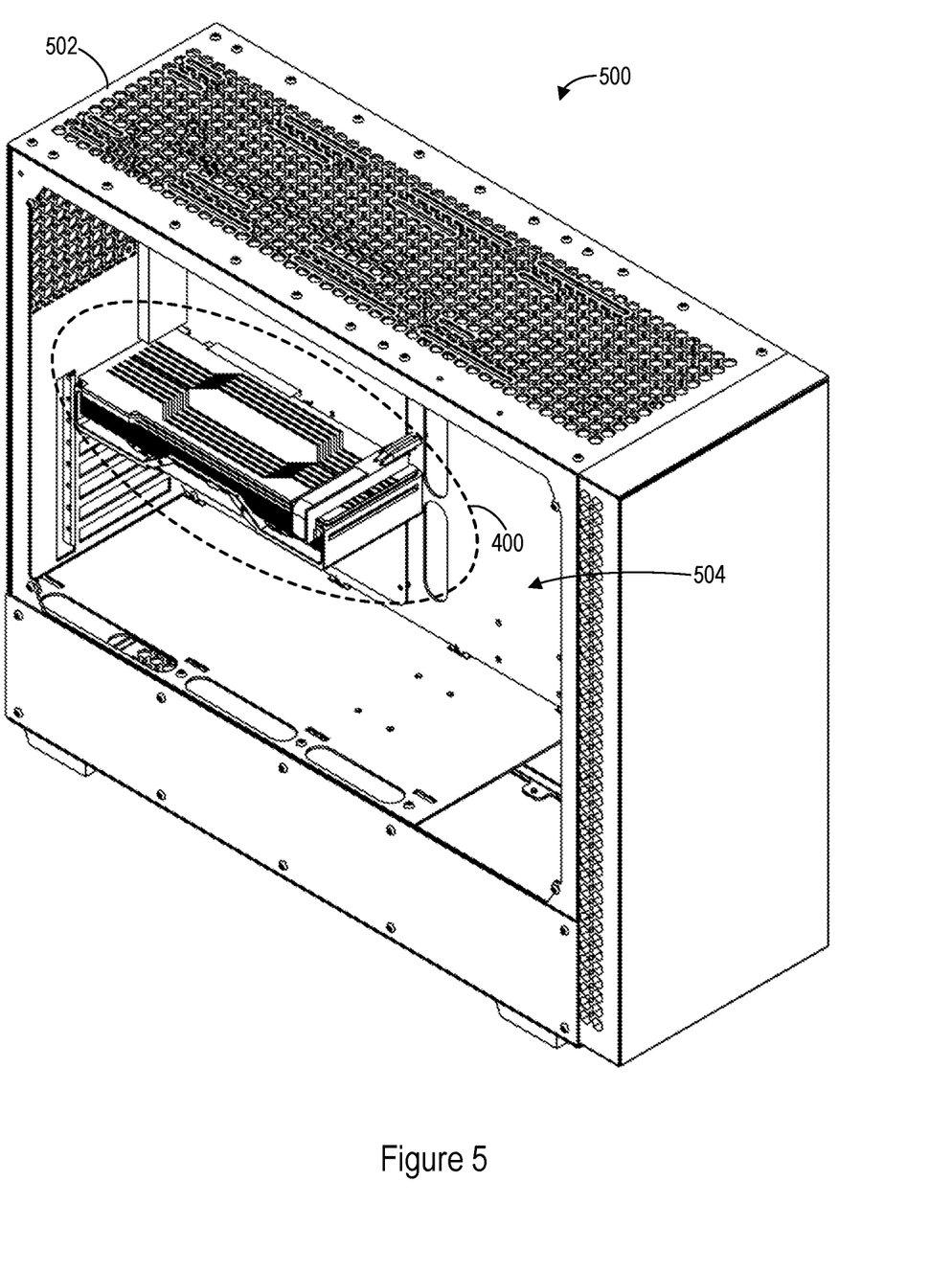
FIG. 5 shows a computer system that includes the system of FIG. 4, in accordance with some embodiments.

FIG. 5 shows a computer system 500 (e.g., a gaming PC) that includes the system 400 (FIG. 4) and thus includes the power connector 200 (FIGS. 2A-2E), in accordance with some embodiments. The system 400 as included in the computer system 500 may include a single power connector 200 or multiple power connectors 200. The computer system 500 includes a chassis 502 with an opening 504 (e.g., in the side of the chassis 502) through which the system 400, including the power connector 200 and the graphics card 402, is visible. Use of the power connector 200 in the computer system 500 simplifies routing of the plurality of power cables 102 to the graphics card 402, hides the power cables 102 from view, and provides decorative lighting from the first LEDs 106 and/or the second LEDs 110, thus improving the appearance of the computer system 500.

Figure 6:
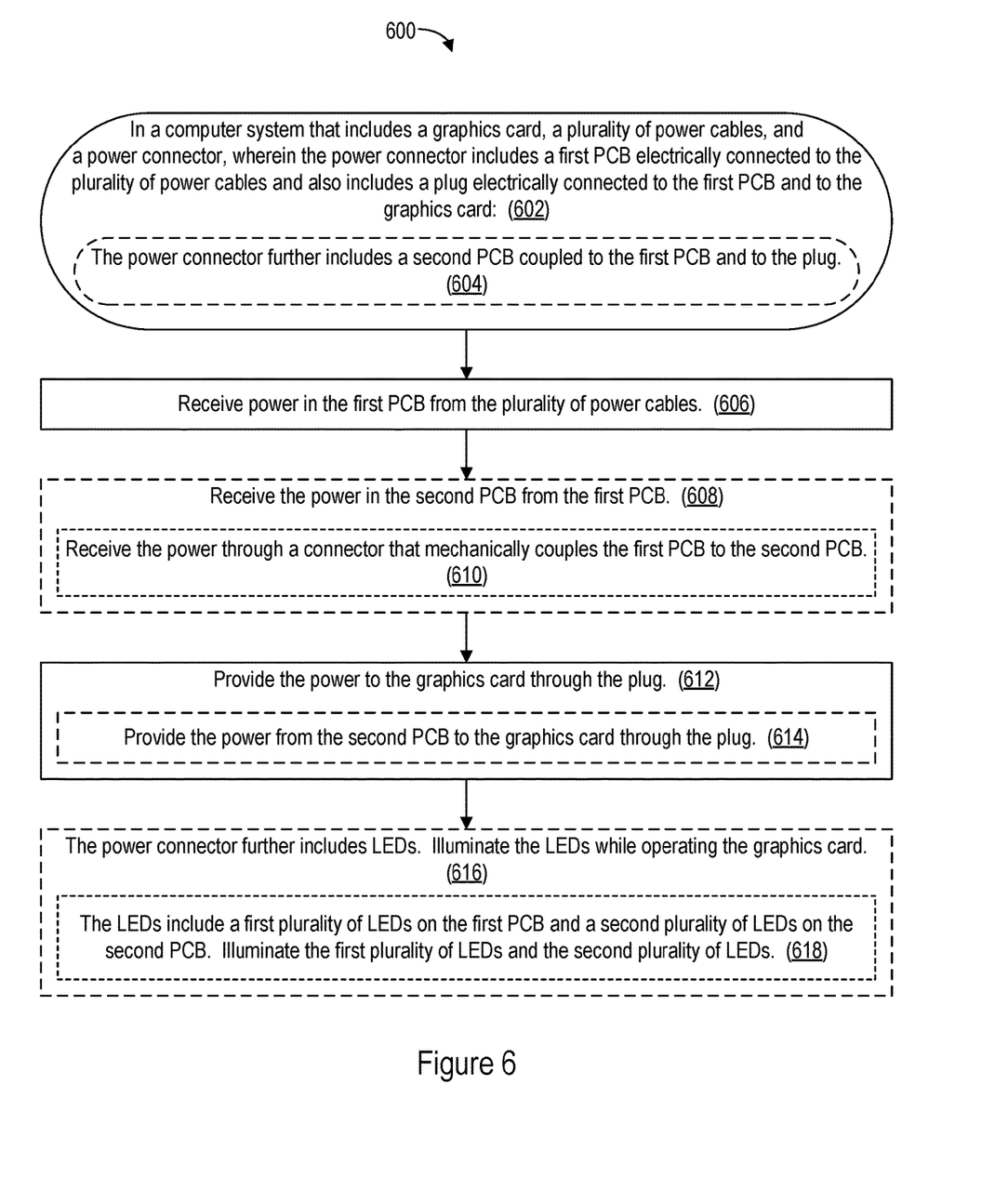
FIG. 6 is a flowchart of a method of operating a graphics card in a computer system, in accordance with some embodiments.

FIG. 6 is a flowchart of a method 600 of operating a graphics card (e.g., graphics card 402) in a computer system (e.g., computer system 500), in accordance with some embodiments. The computer system includes (602) the graphics card, a plurality of power cables (e.g., power cables 102), and a power connector (e.g., power connector 100, 200, or 700). The power connector includes (602) a first PCB (e.g., first PCB 104) electrically connected to the plurality of power cables and also includes a plug (e.g., plug 112) electrically connected to the first PCB and to the graphics card. In some embodiments, the power connector also includes (604) a second PCB (e.g., second PCB 108) coupled to the first PCB and to the plug. The second PCB is disposed between the first PCB and plug.

In the method 600, power is provided from the plurality of power cables through the power connector to the graphics card. The power is received (606) in the first PCB from the plurality of power cables. In some embodiments, the power is received (608) in the second PCB from the first PCB. For example, the second PCB receives (610) the power from the first PCB through a connector (e.g., connector 114) that mechanically couples the first PCB to the second PCB. The power is provided (612) to the graphics card through the plug. In some embodiments, the power is provided (614) from the second PCB to the graphics card through the plug.

In some embodiments, the power connector further includes LEDs (e.g., first LEDs 106 and/or second LEDs 110). The LEDs are illuminated (616) while operating the graphics card. For example, the LEDs include a first plurality of LEDs (e.g., first LEDs 106) on the first PCB and a second plurality of LEDs (e.g., second LEDs 110) on the second PCB. The first plurality of LEDs and the second plurality of LEDs are illuminated (618) while operating the graphics card.

While FIG. 6 shows the steps of the method 600 in a particular order, the steps may be performed simultaneously. For example, the LEDs are illuminated while the power is provided from the plurality of power cables through the power connector to the graphics card.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:
1. A power connector, comprising:
  a first printed circuit board (PCB) to connect to a plurality of power cables and receive power from the plurality of power cables;

a plug, electrically connected to the first PCB, to connect to a graphics card and provide the power to the graphics card; and a second PCB coupled to the first PCB to receive the power from the first PCB and coupled to the plug to provide the power to the graphics card, wherein the plug is to provide the power from the second PCB to the graphics card.

2. The power connector of claim 1, further comprising light-emitting diodes (LEDs) on the first PCB to be illuminated during operation of the graphics card.

3. The power connector of claim 1, further comprising light-emitting diodes (LEDs) to be illuminated during operation of the graphics card.

4. The power connector of claim 3, wherein the LEDs comprise:
a first plurality of LEDs on an upper surface of the first PCB; and
a second plurality of LEDs on an exterior surface of the second PCB.

5. The power connector of claim 4, wherein:
the first plurality of LEDs is arranged in a first array; and
the second plurality of LEDs is arranged in a second array.

6. The power connector of claim 4, wherein the first plurality of LEDs and the second plurality of LEDs are configured to perform an action selected from the group consisting of flashing and blinking in a pattern.

7. The power connector of claim 4, further comprising a casing to house the first PCB and the second PCB;
wherein the casing comprises one or more diffusers to diffuse light from the first plurality of LEDs and the second plurality of LEDs.

8. The power connector of claim 7, wherein the one or more diffusers comprise:
a first diffuser surface, situated adjacent to the first plurality of LEDs, to diffuse light from the first plurality of LEDs; and
a second diffuser surface, situated adjacent to the second plurality of LEDs, to diffuse light from the second plurality of LEDs.

9. The power connector of claim 8, wherein the one or more diffusers further comprise a third diffuser surface to join the first diffuser surface with the second diffuser surface.

10. The power connector of claim 3, wherein the LEDs comprise a plurality of LEDs on an upper surface of the first PCB.

11. The power connector of claim 3, wherein the LEDs comprise a plurality of LEDs on an exterior surface of the second PCB.

12. The power connector of claim 1, further comprising a casing to house the first PCB and the second PCB.

13. The power connector of claim 12, wherein the casing is opaque.

14. The power connector of claim 12, wherein the casing has a plurality of holes to receive the plurality of power cables.

15. The power connector of claim 1, further comprising a connector to mechanically and electrically couple the first PCB to the second PCB, wherein the second PCB is to receive the power from the first PCB through the connector.

16. The power connector of claim 1, wherein the first PCB and the second PCB are arranged at a right angle to each other.

17. The power connector of claim 1, wherein the first PCB comprises a plurality of conductive pads to which ends of the plurality of power cables are to be soldered.

18. The power connector of claim 1, wherein:
the plug is a first plug;
the power connector further comprises a second plug mounted on the first PCB; and
the plurality of power cables terminates in a receptacle to mate with the second plug to connect the first PCB to the plurality of power cables.

19. A computer system, comprising:
a chassis;
a graphics card disposed within the chassis, the graphics card comprising a graphics processing unit;
a plurality of power cables to provide power for the graphics card; and
a power connector disposed within the chassis, the power connector comprising:
a first printed circuit board (PCB), electrically connected to the plurality of power cables, to receive the power from the plurality of power cables; and
a plug, electrically connected to the first PCB and to the graphics card, to provide the power to the graphics card.

20. The computer system of claim 19, wherein:
the chassis has an opening through which the power connector is visible; and
the power connector further comprises light-emitting diodes (LEDs) on the first PCB to be illuminated during operation of the graphics card.

21. The computer system of claim 19, wherein:
the power connector further comprises a second PCB coupled to the first PCB to receive the power from the first PCB and coupled to the plug to provide the power to the graphics card; and
the plug is to provide the power from the second PCB to the graphics card.

22. The computer system of claim 21, wherein:
the chassis has an opening through which the power connector is visible; and
the power connector further comprises light-emitting diodes (LEDs) to be illuminated during operation of the graphics card.

23. The computer system of claim 22, wherein the LEDs comprise:
a first plurality of LEDs on the first PCB; and
a second plurality of LEDs on the second PCB.

24. A method, comprising, in a computer system, providing power from a plurality of power cables through a power connector to a graphics card, wherein:
the power connector comprises:
a first printed circuit board (PCB) electrically connected to the plurality of power cables, and
a plug electrically connected to the first PCB and to the graphics card; and
providing the power from the plurality of power cables through the power connector to the graphics card comprises:
receiving the power in the first PCB from the plurality of power cables, and
providing the power to the graphics card through the plug.

25. The method of claim 24, wherein:
the power connector further comprises light-emitting diodes (LEDs) on the first PCB; and
the method further comprises illuminating the LEDs while operating the graphics card.

26. The method of claim 24, wherein:

the power connector further comprises a second PCB coupled to the first PCB and to the plug;

providing the power from the plurality of power cables through the power connector to the graphics card further comprises receiving the power in the second PCB from the first PCB; and providing the power to the graphics card through the plug comprises providing the power from the second PCB to the graphics card through the plug.

27. The method of claim 26, wherein:

the power connector further comprises light-emitting diodes (LEDs); and the method further comprises illuminating the LEDs while operating the graphics card.

28. The method of claim 27, wherein:

the LEDs comprise a first plurality of LEDs on the first PCB and a second plurality of LEDs on the second PCB; and illuminating the LEDs comprises illuminating the first plurality of LEDs and the second plurality of LEDs.

\* \* \* \* \*